United States Patent [19]

Tullio

[11] 4,314,816
[45] Feb. 9, 1982

[54] DIRECT BLUE DYES FROM THE CONDENSATION OF DIAMINOSTILBENEDISULFONIC ACID WITH N-ALKYL OR N-HYDROXYALKYL-8-AMINO-1-NAPHTHOL-3,6-DISULFONIC ACID

[75] Inventor: Victor Tullio, Wilmington, Del.

[73] Assignee: Mobay Chemical Corporation, Pittsburgh, Pa.

[21] Appl. No.: 154,868

[22] Filed: May 30, 1980

[51] Int. Cl.$^3$ .............................................. D06P 67/00
[52] U.S. Cl. ........................................ 8/527; 260/177; 260/178; 260/182
[58] Field of Search ....................... 260/177, 178, 182; 8/527

[56]  References Cited
U.S. PATENT DOCUMENTS 2,211,752  8/1940  Kappeler ............................. 260/182
2,489,463  11/1949  Reynolds ............................ 260/178
4,118,182  10/1978  Smith ..................................... 8/527

FOREIGN PATENT DOCUMENTS 1742 of 1891 United Kingdom.
5407 of 1893 United Kingdom.
1377697 12/1974 United Kingdom.

Primary Examiner—A. Lionel Clingman
Attorney, Agent, or Firm—Gene Harsh; Lawrence S. Pope

[57] ABSTRACT

A new dye based upon N-alkylated or N-hydroxyalkylated 8-amino-1-naphthol-3,6-disulfonic acid and 4,4'-diaminostilbene-2,2'-disulfonic acid, a procedure for synthesizing it and a procedure for utilizing it for coloring cellulosic substrates is disclosed. The naphthol compound is alkylated or hydroxyalkylated and coupled with the isolated tetrazonium salt of the diamine, and in a preferable embodiment sufficient of the sulfonic acid groups are neutralized to render the final dye water soluble. The procedure is preferably conducted in aqueous medium, and the substitution of the amino group of the naphthol compound is preferably effected with lower dialkyl sulfates or epoxides. The dye is particularly suitable for dyeing paper.

17 Claims, No Drawings

DIRECT BLUE DYES FROM THE CONDENSATION OF DIAMINOSTILBENEDISULFONIC ACID WITH N-ALKYL OR N-HYDROXYALKYL-8-AMINO-1-NAPHTHOL-3,6-DISULFONIC ACID

BACKGROUND OF THE INVENTION

1. Field of the Invention

This invention is concerned with novel direct blue dyes particularly suitable for application to paper and other cellulosic substrates from aqueous solution.

2. Description of the Prior Art

The preparation of water-soluble blue dyes suitable for application to paper, cotton or leather from 1-amino-8-naphthol-3,6-disulfonic acid and 4,4'-diamino-2,2'-stilbenedisulfonic acid by tetrazotization of the diamine followed by coupling to this naphthol and a 2-amino-monosulphonic acid naphthol is disclosed in U.S. Pat. No. 4,118,182. The salts of these condensation products with cations in aqueous solution containing urea are taught to provide useful dyes solutions. The alkylation (ethylation or methylation) of the amino group of a hydroxy disulfonic acid naphthyl amine followed by coupling with a diamine to form a blue cotton dye is disclosed in British Patent 5407. U.S. Pat. No. 2,211,752 also discloses the preparation of blue to violet dyes from hydroxy sulfonic acid naphthyl amines with the amino group unsubstituted or substituted with alkyl or phenyl coupled to tetrazotized 4,4'-diamino-diaryl-3,3'-disulphonic acids where the diaryl nucleus is biphenyl or sulphone bridged biphenyl. The preparation of blue dyes suitable for writing inks and stable in aqueous alkali from the sodium salt of tetrazotized 4,4'-diaminostilbene-2,2'-disulfonic acid coupled to 1-amino-8-naphthol-2,4 or 4,6-disulfonic acid is disclosed in U.S. Pat. No. 2,489,463. Offenlegungsschrift 2,223,311 is concerned with image dyestuffs which can be made from 1-amino-8-naphthol disulfonic acids in which the amino group may carry alkyl substitution coupled by azo bonds to a variety of urea bond-containing residues.

SUMMARY OF THE INVENTION

This invention concerns direct blue dyes obtained from the condensation of the tetrazonium salt of 4,4'-diaminostilbene-2,2'-disulfonic acid with N-alkylated or N-hydroxyalkylated 1-amino-8-naphthol-3,6-disulfonic acid and their use in dyeing paper and related substrates as well as a process for the preparation of such dyes. The free acid form of these dyes is believed to substantially conform to the following structural formula:

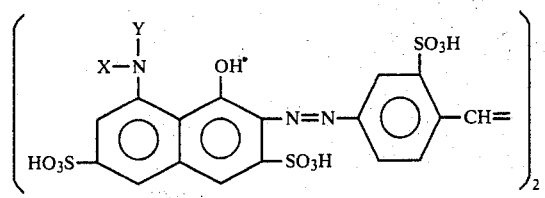

where

X = hydrogen, alkyl of 1-4 carbons or alkyl of 1-4 carbons substituted with hydroxy, and Y = alkyl of 1-4 carbons or alkyl of 1-4 carbons substituted with hydroxy. These dyes may be conveniently water-solubilized by neutralization of the sulfonic acid groups with an appropriate cation former such as triethanolamine and such solubilized dyes are also within this invention.

These dyes may be prepared by alkylating or hydroxyalkylating the amino group of 1-amino-8-naphthol-3,6-disulfonic acid or preferably its salt and reacting it with the tetrazonium salt of 4,4'-diaminostilbene-2,2'-disulfonic acid. The naphthol compound may conveniently be alkylated or hydroxyalkylated by reacting it with an alkylating agent such as a dialkyl sulfate or an epoxide such as ethylene oxide preferably in an aqueous media in the presence of a base such as triethanolamine. The tetrazonium salt may conveniently be prepared by reacting the diamine with a mineral acid, such as hydrochloric acid, and a metal nitrite, such as sodium nitrite, in an aqueous medium. The coupling reaction may then be conducted by mixing an aqueous slurry of the tetrazonium salt with the naphthol compound under neutral to mildly caustic conditions at temperatures in the vicinity of room temperature. If sufficient cation former is present in the reaction medium, the salt form of these dyes, which is readily water soluble, is obtained.

DETAILED DESCRIPTION OF THE INVENTION

The coupler is similar to the known 8-amino-1-naphthol-3,6-disulfonic acid (H-acid) except for alkylation or hydroxyalkylation at the amino group. It may conveniently be formed by reacting the H-acid with an appropriate substitution agent in an aqueous medium. The H-acid is commercially available in its monosodium salt form and may be utilized in this form in the substitution reaction. The substitution agent may be any reagent which will attack the amine without significant attack upon either the aromatic nucleus or the naphthol hydroxyl under the reaction conditions to yield the desired alkyl or hydroxyalkyl substitution. The preferred agents are alkyl sulfates and lower alkyl epoxides, especially diethyl sulfate, ethylene oxide, propylene oxide and butylene oxide.

The substitution reaction may be conducted under any conditions which do not result in modification of the naphthol molecule at other than the amino group. Preferably, the reaction is conducted in an aqueous medium at a slightly acidic pH. The pH of the reaction medium may be adjusted with the same base as is used to form the cation of sulfonic acid salt groups, although other bases may be employed in combination with or in replacement of this base. Useful pH adjustment agents are tertiary amines and alkali metal hydroxides, and preferred, particularly for liquid dyes, are tertiary hydroxy amines of 1-4 carbons such as triethanolamine and lithium hydroxide monohydrate. Preferably, after this reaction is completed sufficient base is added to render the substituted product water soluble. The reaction is preferably conducted under atmospheric pressure and therefore at temperatures below about 100° C. The particular temperature will depend upon the activity of the substituting agent, but in general will be in excess of room temperature. The preferred agents are typically reacted at temperatures between about 50° and 90° C.

The 4,4'-diaminostilbene-2,2'-disulfonic acid may be converted to the tetrazonium salt in accordance with well-known procedures such as those disclosed in U.S. Pat. No. 2,489,463. The classic procedure of reaction with an alkali metal nitrite, such as sodium nitrite, and a mineral acid, such as hydrochloric acid, is particularly convenient. The use of reagents which are water soluble and yield water-soluble products other than the tetrazonium salt are particularly preferred. Such a procedure facilitates the separation of the desired water-insoluble salt. Preferably, the reaction is conducted with an excess of tetrazotizing agent to avoid residual diamine. This excess may conveniently be destroyed at the conclusion of the salt synthesis by the addition of sulfamic acid. The reaction is conveniently conducted at atmospheric pressure and appropriate temperatures for the particular reagents with temperatures around 35° C. being advantageous for sodium nitrite and hydrochloric acid.

The tetrazonium salt is conveniently recovered by filtration. Excess water should be removed from the filtrate by means such as suction or pressure in order to aid in removal of water-soluble impurities. Optionally, the filter cake can be water washed to insure greater purity. The filter cake should be maintained at temperatures below about 40° C. to avoid decomposition.

The coupling reaction is carried out in an aqueous medium preferably by adding the tetrazonium salt to a solution or slurry of the naphthol compound. It is advantageous to utilize the coupler in its water-soluble form and maintain the pH at slightly caustic. The reaction may conveniently be conducted at atmospheric pressure and temperatures between about 0° and 40° C. The water content is advantageously sufficient to maintain the solubility of the coupler and the final dye product but not so excessive as to yield undesirably dilute solutions. The pH should be maintained until no further tetrazonium salt can be detected or for a period of time predetermined for the particular reactants and conditions which assures completion of the coupling reaction. Any necessary pH adjustment is preferably made with the same base as is responsible for the solubility of the coupler and the dye. The addition time and the after-reaction time will depend on the volumes involved as well as the particular reactants and conditions, but addition times of 15–30 minutes and hold times of two hours have been found suitable at a pH of about 7.5 and a reaction temperature around 20° C.

The finished dye may be filtered to ensure freedom from insoluble impurities. The strength of the dye solution may then be adjusted by the addition of water.

The coupler solution obtained after alkylation or hydroxyalkylation of the H-acid according to the preferred procedure hereinabove may advantageously be utilized in the coupling reaction without isolation. It is particularly preferable to utilize the tertiary amine, especially the triethanolamine, salt of the H-acid.

The dyes of the present invention are suitable for imparting color to a variety of substances, particularly those containing cellulose fibers. They are especially suitable for imparting color to paper. They may conveniently be used to dye paper by adding an aqueous solution of the dye to a cellulose pulp slurry. The various species may be intramixed or they may be mixed with other compatible dyes to yield particular colors or shades. In general, the dyes of the present invention impart a blue color to the substrates to which they are applied.

These dyes display good substantivity on paper wherein this property is evaluated by determining the amount of dye necessary to obtain a particular level of color on paper without size or alum compared to that necessary when these additives are present. They show better substantivity when tested in hard water than in soft, and they display a positive response to retention agents, i.e., they improve their substantivity.

These dyes form stable solutions which can be stored and transported in the same manner as liquid dyes known to the paper industry such as the Pontamine ® dyes formerly marketed by Du Pont.

The following examples illustrate the invention. Parts and percentages are by weight unless indicated to the contrary. The illustrated structures are those believed to be obtained based upon the reactants utilized and the conditions of the reaction. The particular reactants were utilized at the purity commercially available and may have contained some impurities including low levels of position isomers of the naphthol compounds.

EXAMPLE 1

Part A

Coupling Component N-Ethyl-H-Acid

The pH of a solution of 451 parts of 8-amino-1-naphthol-3,6-disulfonic acid (H-acid) in 1600 parts water was adjusted to 6.5 with about 213 parts triethanolamine. The solution was heated to 60° C. and 247 parts diethyl sulfate were added with agitation. The temperature rose to 70° C. The resulting solution was heated at 60°–70° C. for three hours, cooled to 15°–25° C., and the pH was adjusted to 8.0 with about 603 parts triethanolamine.

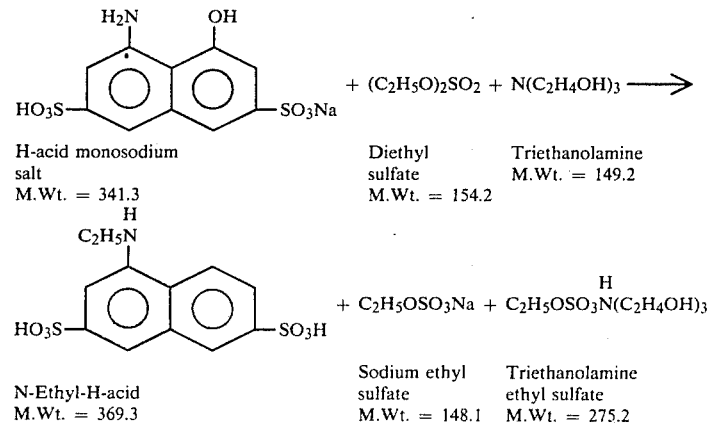

Part B

4,4'-Diaminostilbene-2,2'-Disulfonic Acid Tetrazonium

In a separate vessel, a slurry was prepared of 1260 parts water, 234 parts 30.7% hydrochloric acid and 237 parts 4,4'-diaminostilbene-2,2'-disulfonic acid. The slurry was cooled to 10° C., and 0.4 part of commercial antifoam agent was added. Then, over a period of one hour, 216 parts of a 40.8% aqueous solution of sodium nitrite were added while warming the mixture to 30° C. The excess of sodium nitrite was maintained at 30° C. for 45 minutes, then destroyed by addition of sulfamic acid. The diaminostilbenedisulfonic acid tetrazonium chloride precipitated and was collected by filtration.

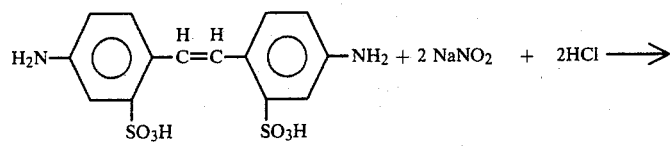

| 4,4'-Diaminostilbene-2,2'- Disulfonic Acid M.Wt. = 370.4 | Sodium Nitrite M.Wt. = 69.0 | Hydrochloric Acid M.Wt. = 36.5 |

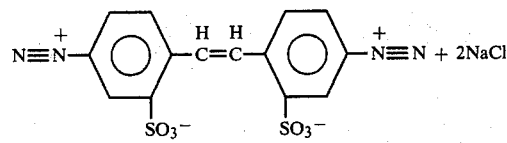

4,4'-Diaminostilbene-2,2'-Disulfonic Acid Tetrazonium Salt (DASDSA Tetrazo)
M.Wt. = 392.4

Part C

Final Dye

The tetrazonium salt filter cake of Part B was added over a period of about 15 minutes to the solution of Part A, maintained at 15°–25° C. and pH 7.0–8.0. A solution of blue dye formed containing the dye structure shown below which is useful for dyeing paper and other cellulosic materials.

above is obtained containing N-methyl groups in place of the N-ethyl groups.

EXAMPLE 2

Part A

A slurry of 11 parts 8-amino-1-naphthol-3,6-disulfonic acid in 18 parts water was prepared and the pH adjusted to 5.5 with triethanolamine. Then, five parts 1,2-epoxybutane were added and the resulting mixture was heated at 70°–90° C. for four hours. The mixture was cooled to 15°–25° C., and the pH was adjusted to 8.0 with triethanolamine.

Part B 4,4'-Diaminostilbene-2,2'-disulfonic acid tetrazonium chloride was prepared using the procedure in Example 1, Part B, from 31.5 parts water, 5.3 parts 31.5% hydrochloric acid, 5.9 parts diaminostilbenedisulfonic acid, 0.04 part antifoam agent and 5.3 parts 40% aqueous sodium nitrite. The salt was isolated by filtration as before.

Part C

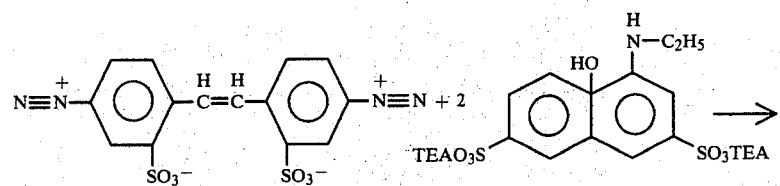

DASDSA Tetrazo
M.Wt. = 392.4

N-Ethyl-H-acid TEA Salt
M.Wt. = 369.3

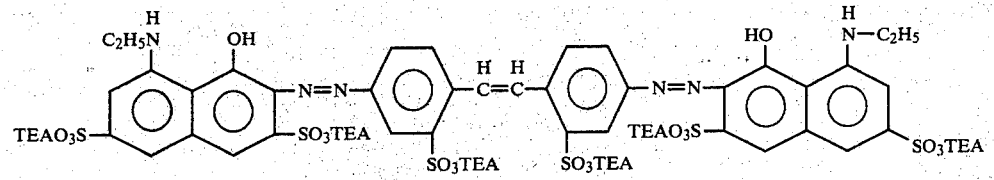

TEA = Triethanolamine    M.Wt. = 1001.0 (as free acid)

This dye displayed a $\lambda_{max}=592.49$ and an $a_{max}=15.816$ on spectral evaluation. It had a substantivity <40% in soft water and >70% in hard water.

If an equimolar amount of dimethyl sulfate is substituted in Part A for the diethyl sulfate, the dye structure The tetrazonium salt filter cake was added to the solution of Part A, using the procedure of Example 1, Part C. The resulting blue dye solution contained the dye structure below and is useful for dyeing paper and other cellulosic materials.

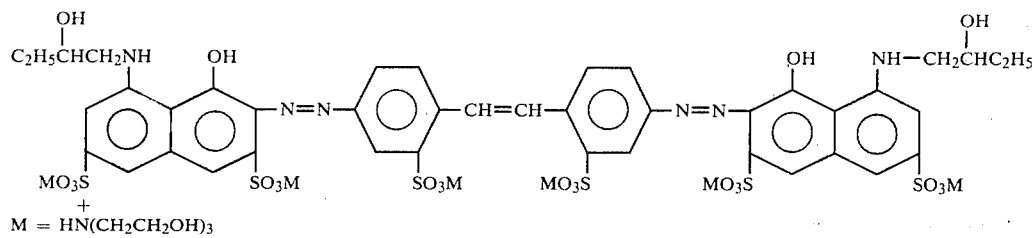

M = HN(CH₂CH₂OH)₃⁺

This dye displayed a $\lambda_{max}=605.17$ and an $a_{max}=16.820$ on spectral evaluation.

EXAMPLE 3

Part A

A slurry of 11 parts 8-amino-1-naphthol-3,6-disulfonic acid in 18 parts water was prepared and the pH was adjusted to 6.0 with lithium hydroxide monohydrate. The mixture was heated to 70°–90° C. and six parts ethylene oxide gas were introduced below the surface of the liquid along with a nitrogen sweep over a four-hour period. The mixture was then cooled to 15°–25° C. and the pH adjusted to 8.0 with triethanolamine.

Part B

The tetrazonium salt of diaminostilbenedisulfonic acid was prepared in the identical manner to Part B of Example 2.

Part C

The tetrazonium salt filter cake from Part B was added to the solution from Part A, using the procedure of Part C, Example 1. The resulting blue dye solution, containing the dye structure below, is useful for dyeing paper and other cellulosic materials.

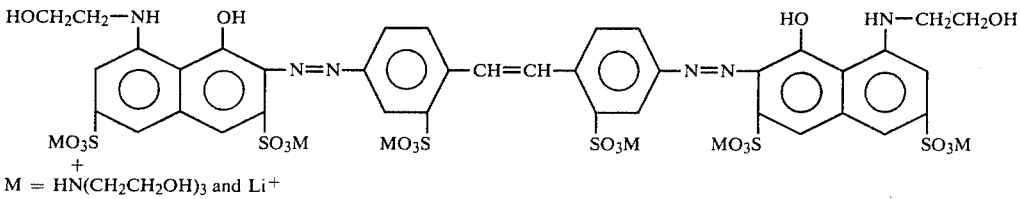

M = HN(CH₂CH₂OH)₃⁺ and Li⁺

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

I claim:

1. A dye obtained from the coupling of N-alkylated or N-hydroxyalkylated 8-amino-1-naphthol-3,6-disulfonic acid or its sulfonic acid salts with tertiary amines or alkali metals to the tetrazonium salt of 4,4'-diaminostilbene-2,2'-disulfonic acid whose sulfonic acid groups may have been neutralized with water solubilizing cations after coupling.

2. The dye of claim 1 wherein at least two moles of said naphthol compound were employed per mole of said tetrazonium salt.

3. The dye of claim 2 wherein the N-substituent of the naphthol compound is derived from a reagent selected from the group consisting of ethylene oxide, propylene oxide, butylene oxide and lower dialkyl sulfate.

4. The dye of claim 3 wherein the said reagent is selected from the group consisting of dimethyl sulfate, diethyl sulfate, ethylene oxide and 1,2-epoxybutane.

5. The dye of claim 3 or claim 4 wherein all the sulfonic acid groups of the dye have been neutralized with triethanolamine, lithium or a combination thereof.

6. The dye of claim 5 wherein the N-alkyl substituent is an ethyl group.

7. A dye of the structure

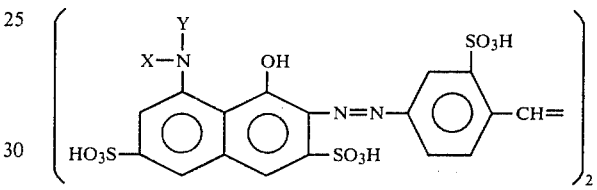

where
X = hydrogen, alkyl of 1–4 carbons or alkyl of 1–4 carbons substituted with hydroxy, and
Y = alkyl of 1–4 carbons or alkyl of 1–4 carbons substituted with hydroxy or its salts with a water-solubilizing cation.

8. The dye of claim 7 wherein X=H and Y=CH₃CH₂—.

9. The dye of claim 7 wherein X=H and Y=CH₂OHCH₂—.

10. The dye of claim 7 wherein X=H and Y=CH₃CH₂CHOHCH₂.

11. A process for the preparation of a direct blue dye comprising:
(a) alkylating or hydroxyalkylating the amino group of 8-amino-1-naphthol-3,6-disulfonic acid or its sulfonic acid salts;
(b) forming the tetrazonium salt of 4,4'-diaminostilbene-2,2'-disulfonic acid; and
(c) coupling the naphthol compounds and the tetrazonium salt in the absence of any significant amount of other couplers reactive with the tetrazonium salt.

12. A dye solution comprising an aqueous solution of the dye of claim 7.

13. A dye solution comprising an aqueous solution of the dye of claim 8.

14. A dye solution comprising an aqueous solution of the dye of claim 9.

15. A dye solution comprising an aqueous solution of the dye of claim 10.

16. A process for the preparation of a direct blue dye solution comprising:
(a) alkylating or hydroxyalkylating the amino group of 8-amino-1-naphthol-3,6-disulfonic acid or its sulfonic acid salts in an aqueous medium;
(b) forming the tetrazonium salt of 4,4'-diaminostilbene-2,2'-disulfonic acid in an aqueous medium;
(c) coupling the naphthol compounds and the tetrazonium salt in the aqueous medium in the absence of any significant amount of other couplers reactive with the tetrazonium salt; and
(d) recovering the dye solution without isolation.

17. The process of claim 16 wherein the strength of the dye solution is adjusted by the addition of water during or following step (d).

* * * * *